US009069948B2

(12) United States Patent
Ahn et al.

(10) Patent No.: US 9,069,948 B2
(45) Date of Patent: Jun. 30, 2015

(54) METHODS, SYSTEMS, AND MEDIA FOR MEASURING QUALITY OF GESTURE-BASED PASSWORDS

(71) Applicants: Gail-Joon Ahn, Phoenix, AZ (US); Ziming Zhao, Tempe, AZ (US)

(72) Inventors: Gail-Joon Ahn, Phoenix, AZ (US); Ziming Zhao, Tempe, AZ (US)

(73) Assignee: GFS Technology, Inc., Scottsdale, AZ (US)

( * ) Notice: Subject to any disclaimer, the term of this patent is extended or adjusted under 35 U.S.C. 154(b) by 15 days.

(21) Appl. No.: 14/139,459

(22) Filed: Dec. 23, 2013

(65) Prior Publication Data

US 2014/0181956 A1 Jun. 26, 2014

Related U.S. Application Data

(60) Provisional application No. 61/740,671, filed on Dec. 21, 2012.

(51) Int. Cl.
G06F 21/00 (2013.01)
G06F 21/46 (2013.01)
G06F 3/01 (2006.01)
G06F 21/36 (2013.01)
H04L 9/32 (2006.01)

(52) U.S. Cl.
CPC ............... G06F 21/46 (2013.01); G06F 3/017 (2013.01); G06F 21/36 (2013.01); H04L 9/3226 (2013.01)

(58) Field of Classification Search
CPC ......... G06F 21/36; G06F 21/46; G06F 3/017; H04L 9/3226
USPC ................................................ 726/18, 19, 21
See application file for complete search history.

(56) References Cited

U.S. PATENT DOCUMENTS

| 2012/0198529 | A1* | 8/2012 | Theimer et al. | 726/6 |
|---|---|---|---|---|
| 2012/0304284 | A1* | 11/2012 | Johnson et al. | 726/19 |
| 2013/0086674 | A1* | 4/2013 | Horvitz et al. | 726/19 |
| 2013/0094770 | A1* | 4/2013 | Lee et al. | 382/218 |
| 2014/0075549 | A1* | 3/2014 | Lewis et al. | 726/19 |

OTHER PUBLICATIONS

Alexe, B., et al., "Measuring the Objectness of Image Windows", In IEEE Transactions on Pattern Analysis and Machine Intelligence, vol. 34, No. 11, Jan. 17, 2012, pp. 2189-2202.
Canny, J., "A Computational Approach to Edge Detection", In IEEE Transactions on Pattern Analysis and Machine Intelligence, vol. 8, No. 6, Nov. 1986, pp. 679-698.
Zhang, Y., et al., "The Security of Modern Password Expiration: An Algorithmic Framework and Empirical Analysis", In Proceedings of the 17th ACM Conference on Computer and Communications Security, Chicago, Illinois, United States, Oct. 4-8, 2010, pp. 176-186.

* cited by examiner

Primary Examiner — Hadi Armouche
Assistant Examiner — Dao Ho
(74) Attorney, Agent, or Firm — Byrne Poh LLP

(57) ABSTRACT

Methods, systems, and media for measuring gesture-based password quality are provided, the methods comprising: receiving a first image; receiving a proposed password; identifying points of interest in the image each associated with an attribute; receiving a gesture selection function sequence, with a plurality of gesture selection functions each associated with a gesture type and a point of interest attribute; determining that a subset of points of interest in the image have attributes corresponding to attributes associated of a gesture selection function sequence; generating a possible password based on the gesture selection function sequence; determining and presenting a relative strength of the proposed password based on whether the proposed password matches the possible password.

15 Claims, 9 Drawing Sheets

METHODS, SYSTEMS, AND MEDIA FOR MEASURING QUALITY OF GESTURE-BASED PASSWORDS

CROSS-REFERENCE TO RELATED APPLICATIONS

This application claims the benefit of U.S. Provisional Patent Application No. 61/740,671, filed Dec. 21, 2012, which is hereby incorporated by reference herein in its entirety.

TECHNICAL FIELD

The disclosed subject matter relates to methods, systems, and media for measuring quality of gesture-based passwords.

BACKGROUND

Inputting text-based passwords on a device that receives input primarily via a touchscreen is often unwieldy and time-consuming. The quality of text-based passwords can be calculated, and based on the quality the user can be informed of whether the selected password would be difficult to crack. Many touchscreen devices, such as smartphones and tablets, use pin-based or pattern-based authentication schemes (e.g., for unlocking the device). These schemes typically have limited password spaces, which can cause the device and/or information protected by the schemes to be less secure. Gesture-based passwords have been proposed as a way to both provide greater security through a larger password space, as well as easier entry of the password by utilizing the touchscreen functionality directly rather than by opening a keyboard. For example, a gesture-based password scheme can allow a user to choose any image, and use that image as a background for a gesture-based password (e.g., including tap, line and circle gestures) that can represent the user's knowledge of the gesture-based password and its correspondence to the selected image. However, techniques for measuring password quality for such gesture-based passwords do not exist, and therefore a user may inadvertently choose an easily cracked gesture-based password believing it to be secure.

Accordingly, it is desirable to provide methods, systems, and media for measuring quality of gesture-based passwords.

SUMMARY

In accordance with various embodiments of the disclosed subject matter, methods, systems, and media for measuring quality of gesture-based passwords are provided.

In accordance with some embodiments of the disclosed subject matter, a method for measuring gesture-based password quality is provided, the method comprising: receiving, using a hardware processor, a first image; receiving a proposed gesture-based password associated with the first image; identifying a plurality of points of interest in the received image, wherein the each of the plurality of points of interest is associated with at least one point of interest attribute; receiving a gesture selection function sequence, wherein the gesture selection function sequence comprises a plurality of gesture selection functions, and wherein each gesture selection function is associated with a gesture type of a plurality of gesture types and at least one point of interest attribute; determining that a subset of the plurality of points of interest in the received image have point of interest attributes that correspond to attributes associated with the gesture selection functions of the gesture selection function sequence; generating a possible password for the first image based on the gesture selection functions in the gesture selection function sequence in response to determining that the a subset of the plurality of points of interest correspond to the attributes associated with the gesture selection functions included in the particular gesture selection function sequence; determining whether the proposed password matches the possible password; determining a relative strength of the proposed password based at least in part on the determination of whether the proposed password matches the possible password; and causing the relative strength of the proposed password to be presented.

In accordance with some embodiments of the disclosed subject matter, a system for measuring gesture-based password quality is provided, the system comprising: a hardware processor programmed to: receive a first image; receive a proposed gesture-based password associated with the first image; identify a plurality of points of interest in the received image, wherein the each of the plurality of points of interest is associated with at least one point of interest attribute; receive a gesture selection function sequence, wherein the gesture selection function sequence comprises a plurality of gesture selection functions, and wherein each gesture selection function is associated with a gesture type of a plurality of gesture types and at least one point of interest attribute; determine that a subset of the plurality of points of interest in the received image have point of interest attributes that correspond to attributes associated with the gesture selection functions of the gesture selection function sequence; generate a possible password for the first image based on the gesture selection functions in the gesture selection function sequence in response to determining that the a subset of the plurality of points of interest correspond to the attributes associated with the gesture selection functions included in the particular gesture selection function sequence; determine whether the proposed password matches the possible password; determine a relative strength of the proposed password based at least in part on the determination of whether the proposed password matches the possible password; and cause the relative strength of the proposed password to be presented.

In accordance with some embodiments of the disclosed subject matter, a non-transitory computer-readable medium containing computer executable instructions that, when executed by a processor, cause the processor to perform a method for measuring gesture-based password quality is provided, the method comprising: receiving a first image; receiving a proposed gesture-based password associated with the first image; identifying a plurality of points of interest in the received image, wherein the each of the plurality of points of interest is associated with at least one point of interest attribute; receiving a gesture selection function sequence, wherein the gesture selection function sequence comprises a plurality of gesture selection functions, and wherein each gesture selection function is associated with a gesture type of a plurality of gesture types and at least one point of interest attribute; determining that a subset of the plurality of points of interest in the received image have point of interest attributes that correspond to attributes associated with the gesture selection functions of the gesture selection function sequence; generating a possible password for the first image based on the gesture selection functions in the gesture selection function sequence in response to determining that the a subset of the plurality of points of interest correspond to the attributes associated with the gesture selection functions included in the particular gesture selection function sequence; determining whether the proposed password matches the possible password; determining a relative strength of the proposed password based at least in part on the determination of whether the proposed password matches the possible password; and causing the relative strength of the proposed password to be presented.

In some embodiments, receiving the gesture selection function sequence comprises receiving a ranked list of gesture selection function sequences including a plurality of gesture selection function sequences ranked based on a probability that a user will use a password generated by the gesture selection function sequence as the proposed password.

In some embodiments, the method further comprises: generating a plurality of possible passwords that represent simulated proofs of knowledge for the first image based on the gesture selection functions in each of the plurality of gesture selection function sequences, wherein the possible password is generated as one of the plurality of possible passwords; ranking the plurality of possible passwords based at least in part on a ranking of the gesture selection function sequence used to create each of the plurality of possible passwords; and wherein determining a relative strength of the proposed password, which represents a proof of knowledge of the first image, comprises determining whether the proposed password matches any one of the plurality of possible passwords by leveraging the simulated proofs of knowledge, and determining a rank of a matching password of the plurality possible passwords in response to determining that the proposed password matches one of the plurality of the plurality of passwords.

In some embodiments, the proposed password includes at least three ordered gestures each of which is associated with a gesture type of the plurality of gesture types and at least one location in the first image; and wherein the proposed password includes at least three ordered gestures each of which is associated with a gesture type of the plurality of gesture types and at least one location in the first image.

In some embodiments, determining whether the proposed password matches the possible password comprises: comparing the ordered gestures of the proposed password and the ordered gestures of the possible password; determining whether the types of corresponding ordered gestures of the proposed password and possible password, respectively, are the same; and determining whether the location of the corresponding ordered gestures are within a threshold distance.

In some embodiments, the at least one point of interest attributes are descriptive of at least one of the following: a semantic category of the point of interest; a shape of the point of interest; a color of the point of interest; and a size of the point of interest.

In some embodiments, identifying a plurality of points of interest in the image data of the first image comprises using one or more object detection techniques to identify point of interest in the first image data.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
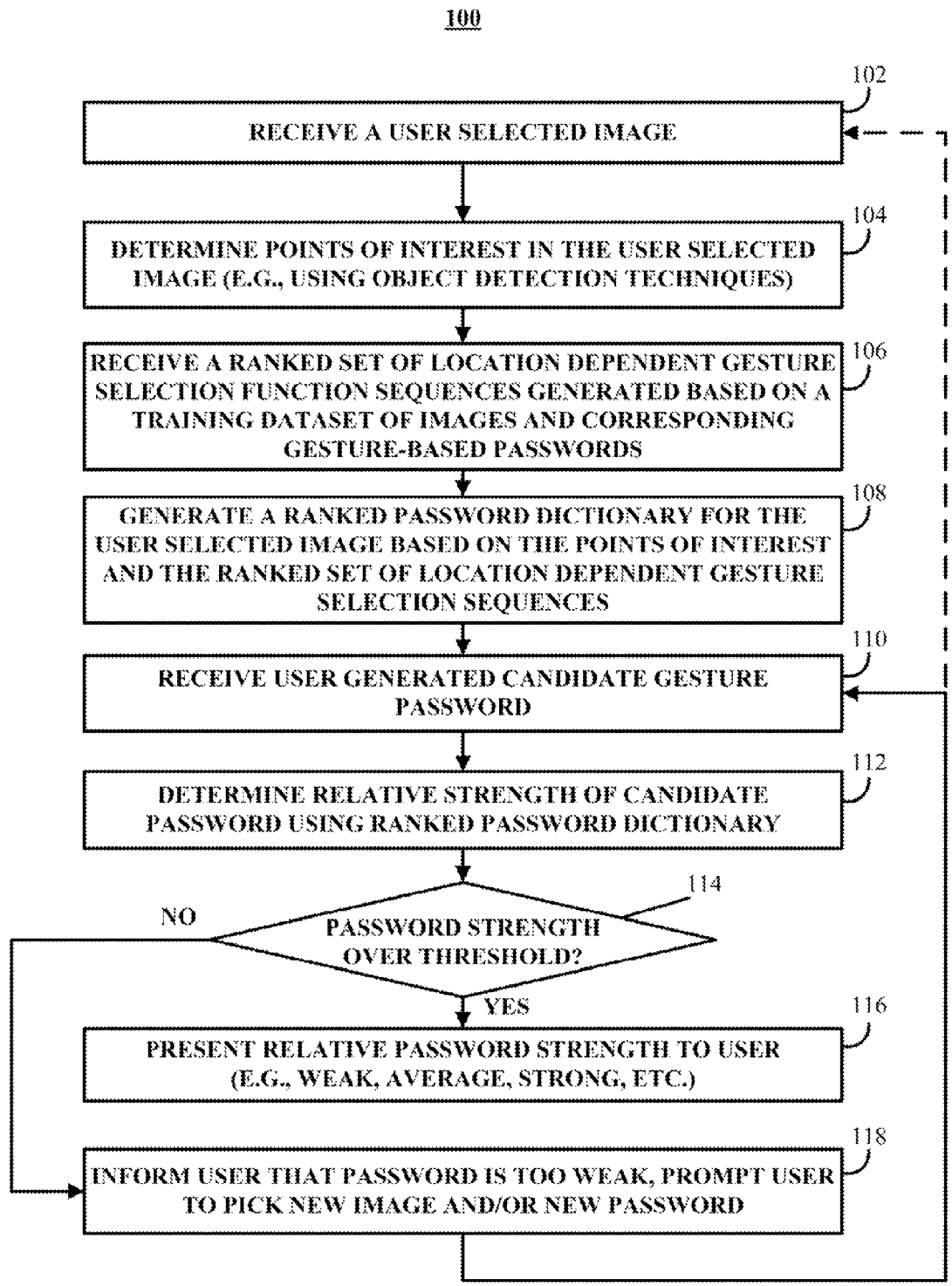
FIG. 1 shows an example of a process for measuring quality of gesture-based passwords in accordance with some embodiments of the disclosed subject matter.

In accordance with various embodiments, mechanisms (which can include methods, systems, and/or media) for measuring quality of gesture-based passwords are provided.

In some embodiments, the mechanisms described herein can use a training dataset of images and corresponding gesture-based passwords to train a model for measuring quality of gesture-based passwords. In some embodiments, the mechanisms described herein can receive the images of the training dataset and use object detection techniques to extract points of interest from the images in the training dataset. In some embodiments, the mechanisms described herein can compare the points of interest to the gestures included in the gesture passwords of the training set to generate gesture selection functions. For example, if the training dataset includes images of people and at least one of the gesture-based passwords for those images includes a circle around a person's head, a gesture selection function that chooses "circle a head" can be generated by the mechanisms.

In some embodiments, the mechanisms described herein can generate a ranked list of gesture selection function sequences to be used in attempting to crack a user's password based on a user-selected image. The list of gesture selection function sequences can be ranked, in some embodiments, based on the correspondence between points of interest in the images of the training dataset and the gestures in the corresponding passwords of the training dataset. For example, if the images in the training dataset include people and the gesture "circle a head" is frequently included in the passwords associated with those images, a sequence that includes "circle a head" can be ranked relatively high by the mechanisms described herein.

In some embodiments, the mechanisms described herein can use the ranked list of gesture selection function sequences to generate a ranked password dictionary based on a user-selected image. The mechanisms can extract points of interest from the user-selected image and use these points of interest to generate the ranked password dictionary using the ranked gesture selection function sequences. For example, if the user-selected image includes images of people, the mechanisms described herein can generate passwords using the ranked list of sequences which can include the passwords generated from the relatively highly ranked sequences that include a gesture selection function for "circle a head."

In some embodiments, the mechanisms described herein can determine a measure of quality of a gesture-based password using the ranked password dictionary. For example, the mechanisms can compare the passwords in the ranked password dictionary to an inputted password by a user. Based on whether there is a matching password in the password dictionary and how highly ranked the match is, the mechanisms can determine a relative strength of the password. In a more particular example, as described above in the example of the user-submitted image that includes people, if the password input by the user does not include the gesture "circle a head," then the password will not match any passwords generated from gesture selection function sequences that generate passwords that include the gesture "circle a head."

Turning to FIG. 1, an example 100 of a process for measuring quality of gesture-based passwords is shown in accordance with some embodiments of the disclosed subject matter. In some embodiments, process 100 can begin by receiving a user selected image to be used as a background for the gesture-based password, at 102. The image received at 102 can be selected using any suitable technique and can be selected from any suitable source. For example, the image can be selected from images stored in memory of a computing device for which the image is to be used as the background for the gesture-based password. As another example, the image can be selected from images stored on a remote device (e.g., as part of a web page or web page portion, through an application that accesses the remotely stored images, etc.). In some embodiments, the received image can be an image that was previously unknown to process 100. For example, the choice of an image to use as the background for the gesture-based password can be left to the user and need not be chosen from a group of pre-selected images. In some embodiments, the image can be received in any suitable format. For example, the image can be received as an image file such as a JPG, PNG, BMP, TIFF, and/or any other suitable image file format. As another example, the image can be received in compressed form with integrity preservation such as in a ZIP file. As yet another example, the image can be received in a compressed form based on a lossy compression scheme. As yet another example, information about the image can be received rather than the image itself. In a more particular example, points of interest extracted from the image (e.g., as described below in connection with 104) can be received at 102 in addition to, or in lieu of, an image.

At 104, process 100 can determine points of interest in the user selected image. In some embodiments, a point of interest can be any standout region in an image. For example, points of interest can be a region in the image that includes an object with a semantically rich meaning, such as a face, an eye, a car, a clock, and/or any other suitable object with a semantically rich meaning. As another example, a point of interest can be a region in the image that includes a particular shape, such as a line, a triangle, a circle, and/or any other suitable shape. As yet another example, a point of interest can be a region in the image that includes a particular color that stands out in the image, such as red, green, blue, and/or any other suitable color. As still another example, a point of interest can be an object or region in the image that stands out for any other reason and/or based on any other suitable criteria. In some embodiments, a region can be identified as a point of interest for multiple reasons, such as the fact that it includes a semantically rich object such as an apple, and because it includes a color that stands out in the picture such as because the apple is red.

In some embodiments, a point of interest can be specified using any suitable information. For example, each point of interest extracted from the image received at 102 can be identified by coordinates that identify a rectangular region in the image that circumscribes the point of interest and attributes describing the point of interest. In a more particular example, a point of interest can be specified as a 5-tuple $\langle x_1, y_1, x_2, y_2, D \rangle$, where $\langle x_1, y_1 \rangle$ and $\langle x_2, y_2 \rangle$ are coordinates of the top-left and bottom-right points of the circumscribed rectangle, respectively. Additionally, D can be a set of one or more attributes about the point of interest, such as descriptors used to define an object. For example, D can be include three sub-categories $D_o$, $D_s$ and $D_c$, and four wildcards $*_o$, $*_s$, $*_c$ and $*$. $D_o$ can be a set of semantically rich object descriptions such that $D_o = \{$face, eye, nose, clock, ... $\}$, $D_s$ can be a set of shape descriptions such that $D_s = \{$line, rectangle, circle, ... $\}$, and $D_c$ can be a set of color descriptions such that $D_c = \{$red, blue, yellow, ... $\}$. Any suitable number and variety of object descriptors can be included in the various sets of object descriptors. Wildcards $*_o$, $*_s$, $*_c$ and $*$ can be used when an object is detected, but the attributes are not determined (e.g., when an object detection measure such as an objectness measure is used).

Any suitable technique or combination of techniques can be used to determine points of interest in the image received at 102. For example, process 100 can use object detection techniques that identify objects as belonging to a certain class of objects to determine points of interest. In a more particular example, process 100 can use the Viola-Jones object detection framework to detect objects such as face, eye, nose, mouth, ear, head, body, clock, and/or any other suitable objects. The Viola-Jones framework can utilize Haar-like features in an image to detect objects in an image using learned Haar cascades. As another example, process 100 can use one or more low-level feature detection techniques to extract points of interest in an image from regions that exhibit certain attributes without identifying the region as including a particular semantic class of object. In a more particular example, process 100 can use Canny edge detection techniques and/or Hough transform techniques to identify shapes in an image (e.g., circles) and can use contour detection techniques to identify regions with colors that are different than the colors of surrounding regions. Additionally, process 100 can use any other suitable techniques or combination of techniques to detect particular shapes and/or colors in regions of the image. As yet another example, process 100 can determine that a point of interest exists where an object is detected using an objectness measure. An objectness measure can indicate a confidence value that a particular region includes an object of interest (e.g., as opposed to a background region) without specifying attributes of the object, in some embodiments. As still another example, a human can be presented with the image and queried to identify points of interest in the image. In a more particular example, the image can be submitted to a service such as AMAZON MECHANICAL TURK with instructions to a worker to identify points of interest in the image having certain attributes. These points of interest identified by a human can then be communicated back to process 100.

In some embodiments, process 100 can determine all points of interest identified using various techniques and can cull the set of points of interest using various criteria. For example, the points of interest identified using various techniques can be compared, and duplicates that are identified can be discarded. As another example, process 100 can rank the points of interest based on a confidence measure associated with the point of interest and/or the technique or techniques that identified the point of interest. In a more particular example, certain shapes can be identified with a lower false positive rate and points of interest corresponding to these shapes can have a higher confidence measure. As another more particular example, certain techniques can identify points of interest with a relatively high or a relatively low false positive rate. These false positive rates can be taken into account when determining the confidence measure. In some embodiments, when duplicates are discarded process 100 can keep the point of interest identified with most confidence and/or using a detection technique with a low false positive rate.

At 106, process 100 can receive a ranked set of location dependent gesture selection function sequences generated based on a training dataset of images and corresponding gesture-based passwords. Location dependent gesture selection functions are sometimes referred to herein as gesture selection functions. Generation of the ranked set of location dependent gesture selection function sequences can be performed, for example, as described below in connection with 212 of FIG. 2. In some embodiments, the ranked set of location dependent gesture selection function sequences can be generalized so as to apply to an unknown image (e.g., the image received at 102). For example, the ranked set of location dependent gesture selection sequences can include one or more sequences of gesture selection functions that can be used to generate one or more gesture passwords (e.g., in accordance with the gesture password rules) for cracking the user's password based on a given image. As described below in connection with 208 of FIG. 2, a gesture selection function can indicate a particular gesture and an associated point of interest or points of interest. When generating passwords, as described below in connection with 108, process 100 can use a gesture selection function to identify one or more gestures to be used in generating a gesture password for cracking the user's password. In some embodiments, as described below in connection with 208 of FIG. 2, a gesture selection function can take a gesture type, one or more point of interest attributes (e.g., types of points of interest), and a set of points of interest in an image (e.g., the image received at 102), and can output a set of corresponding location dependent gestures for the image. For example, the gesture selection function s (tap, {red, apple}, $\theta_k$) can receive the set of points of interest $\theta_k$ for an image k and can be interpreted by process 100 as an instruction to "tap a red apple in the points of interest k." If there are multiple red apples represented in the set of points of interest $\theta_k$, process 100 can receive multiple gestures that correspond to an output of the gesture selection function. Similarly, a sequence of gesture selection functions can specify a series of gestures to be used as a password to attempt to crack the user's password. In some embodiments, each gesture selection function in the sequence can generate multiple gestures based on the points of interest in the image, and therefore a sequence of, for example, three gesture selection functions can generate multiple passwords. For example, for the gesture selection sequence [s(circle, {head}, $\theta_k$), s(line, {nose}, {nose}, $\theta_k$), s(tap, {nose}, $\theta_k$)] can generate 192 different sequences of location dependent gestures (e.g., 192 difference possible passwords) for an image that includes four heads, and four noses (e.g., four heads that can be circled, four beginning noses each having three corresponding ending noses between which a line can be drawn, and four noses which can be tapped=4×(4×3)×4=192 unique passwords).

At 108, process 100 can generate a ranked password dictionary for the user selected image based at least in part on the points of interest in the user selected image and the ranked set of location dependent gesture selection sequences. In some embodiments, process 100 can generate the ranked dictionary by creating possible passwords based on each of the ranked gesture selection function sequences in order. For example, as described above, if the highest ranked gesture selection sequence is [s(circle, {head}, $\theta_k$), s(line, {nose}, {nose}, $\theta_k$), s(tap, {nose}, $\theta_k$)], process 100 can generate passwords based on that gesture selection function sequence, and can then generate passwords for the next gesture selection function sequence, and so on, until passwords have been generated for each gesture selection function sequence in the ranked set of gesture selection function sequences and/or a predetermined number of passwords have been generated.

In some embodiments, if the received user-selected image does not include a point of interest that has an attribute that corresponds to one or more gesture selection functions in a given gesture selection function sequence, that gesture selection function sequence can be ignored or otherwise discarded when generating the ranked password dictionary.

In some embodiments, process 100 can generate a set of gesture-based passwords by applying each of the gesture selection function sequences to the image. Process 100 can rank this set of gesture-based passwords according to the rank of the gesture selection function sequence from which each of the passwords was generated. However, because multiple passwords can be generated based on the same gesture selection function sequence, process 100 can, in some embodiments, rank each subset of passwords generated from a particular gesture selection function sequence. Any suitable technique can be used to rank a subset of passwords generated from the same gesture selection function sequence. For example, a pattern of the locations of the gestures in each password generated from the gesture selection function sequence can be used to rank the passwords generated from that sequence against each other. In a more particular example, during a training phase (e.g., as described in connection with FIG. 2), an alignment of each password received in the training dataset can be measured, and alignments can be ranked from most popular to least popular. In such an example, passwords in the password dictionary that are generated from the same gesture selection function sequence can be ranked based on how closely the alignment of the gestures in each password correspond with a ranked alignment from the training phase. In some embodiments, for example, alignments of the password can be based on whether the gestures in a password follow a line pattern. The line pattern can be a horizontal line from left-to-right (denoted as H+), a horizontal line from right-to-left (denoted as H−), a vertical line from top-to-bottom (denoted as V+), a vertical line from bottom-to-top (denoted as V−), or some combination (e.g., a diagonal line). In such embodiments, if during the training phase the most popular pattern is a horizontal pattern from left-to-right (e.g., H+), process 100 can rank a password generated from a particular gesture selection function sequence having an alignment that most closely matches the H+ pattern first, and so on. In some embodiments, passwords that do not exhibit a ranked alignment from the training phase can be ranked after passwords that match a pattern from the training phase.

In some embodiments, process 100 can rank all passwords generated from the ranked set of gesture selection function sequences using the points of interest in the received image as inputs to the gesture selection functions. Alternatively, process 100 can discard passwords after a predetermined number of passwords have been generated and/or ranked.

In some embodiments, process 100 generates, at 108, passwords to be used as simulated proofs of knowledge. These simulated proofs of knowledge can then be leveraged to perform a comparison between a password input by the user and these simulated proofs of knowledge (e.g., as described below in connection with 112) for a user-selected image (e.g., an image received as described above in connection with 102).

At 110, process 100 can receive a user-generated candidate gesture password. In some embodiments, the user-generated candidate gesture password can be any suitable combination of gestures that includes at least a minimum number of gestures in accordance with specified password rules. Examples of password rules are described below in connection with 202 of FIG. 2.

At 112, process 100 can determine the relative strength of the user generated candidate password received at 110 using the ranked password dictionary generated at 108. For example, process 100 can compare the user-generated candidate password to passwords in the ranked password dictionary. In some embodiments, process 100 can determine the strength of the user generated candidate password based on whether the user-generated password matches a password in the ranked password dictionary and/or what the ranking is of the password that matches the candidate password. For example, if the user-generated candidate password is not matched by any password in the password dictionary, process 100 can determine that the password is a relatively strong password. As another example, if the user-generated candidate password matches a password in the five worst passwords in the password dictionary (e.g., the five passwords that process 100 guesses first), process 100 can determine that the password is a relatively weak password. Additionally or alternatively, process 100 can determine the relative strength of the password based on whether one or more location dependent gestures appear in the ranked dictionary and/or what ranking a password or passwords that include the gesture have in the rankings. For example, if the user includes the gesture "tap a nose" in the user-generated candidate password, and the gesture "tap a nose" appears in a password that is ranked as a poor or weak password in the password dictionary, process 100 can determine that the password would be stronger if that gesture were changed.

In some embodiments, process 100 can determine whether a password in the ranked password dictionary matches the user-generated candidate password based on whether using the password in the password dictionary would allow access to a device which uses the password as an access control mechanism (e.g., whether the password could be used interchangeably with the registered password). For example, process 100 can consider a password to be a matching password if it could be entered by a malicious user to access the user's device.

At 114, process 100 can determine whether the relative password strength is greater than a threshold password strength, in some embodiments. The threshold can be set based on any suitable criteria. For example, process 100 can enforce minimum rules that a password must meet to be considered a valid password such as including at least two types of gestures (e.g., tap and circle, circle and line, etc.), including a minimum number of gestures (e.g., at least three gestures, exactly three gestures, etc.). As another example, process 100 can determine that the password is below a threshold password strength if the user-generated candidate password matches a password in the password dictionary of a relatively weak password rank (e.g., in the first five passwords, in the first one thousand passwords, in the ten percent of weakest passwords, etc.). As still another example, process 100 can determine that the password is below a threshold password strength if the first two gestures in the user generated candidate password match the first two gestures in any password in the ranked password dictionary of a relatively weak password rank (e.g., in the first five hundred passwords, in the first five percent of passwords, etc.).

If the strength of the candidate password is below the threshold ("NO" at 114), process 100 can proceed to 118 and can inform the user that the candidate password is too weak, can prompt the user to pick a new image to use as a background and/or can prompt the user to pick a new password. Otherwise, if the strength of the candidate password is at or above the threshold ("YES" at 114), process 100 can proceed to 116.

At 116, process 100 can cause the relative password strength of the candidate password to be presented to the user. Any suitable techniques can be used to convey the relative strength of the user generated candidate password. For example, the password strength can be presented using qualitative and/or quantitative signifiers of password strength. In a more particular example, the password strength can be presented using qualitative terms such as weak, average, strong, etc. As another example, the password strength can be presented using quantitative signifiers of password strength such as a percentage, a bar graph, etc.

In some embodiments, after presenting the user with the relative strength of the candidate password at 116, process 100 can cause the user to be presented with the option of confirming and/or saving the candidate password and/or with the option of selecting a new password. Additionally, in some embodiments, if the user is informed that the candidate password is too weak at 118, process 100 can cause the user to be presented with the option of selecting a new password without the opportunity to confirm and/or save the candidate password. If the user elects to pick a new password, process 100 can return to 110 and the can receive a new user generated candidate password. Additionally or alternatively, process 100 can return to 102 and can receive a new user-selected image.

In some embodiments, process 100 can cause information to be presented to the user about how the password can be changed to improve the password strength. This information can include general advice such as to user multiple gesture types, to not form a line with the gestures in the password, to pick an image with many points of interest, and/or any other suitable general advice on how to form a strong gesture-based password. In some embodiments, this advice can be generated based on observed characteristics of the passwords in the training dataset. Additionally or alternatively, process 100 can cause individualized advice to be presented to the user about how to improve the password strength based on the image received at 102. For example, process 100 can randomly choose a gesture that is not included in the ranked password dictionary (e.g., a gesture that is not included in any password in the ranked password dictionary) or is not included in the top fifty percent of the weakest passwords, and process 100 can suggest that the user incorporate that gesture into the user's password. As another example, process 100 can determine an alignment that would be most likely to be chosen in the image based on the training dataset and highlight a region that includes the pattern as a region to avoid using in a password.

Figure 2:
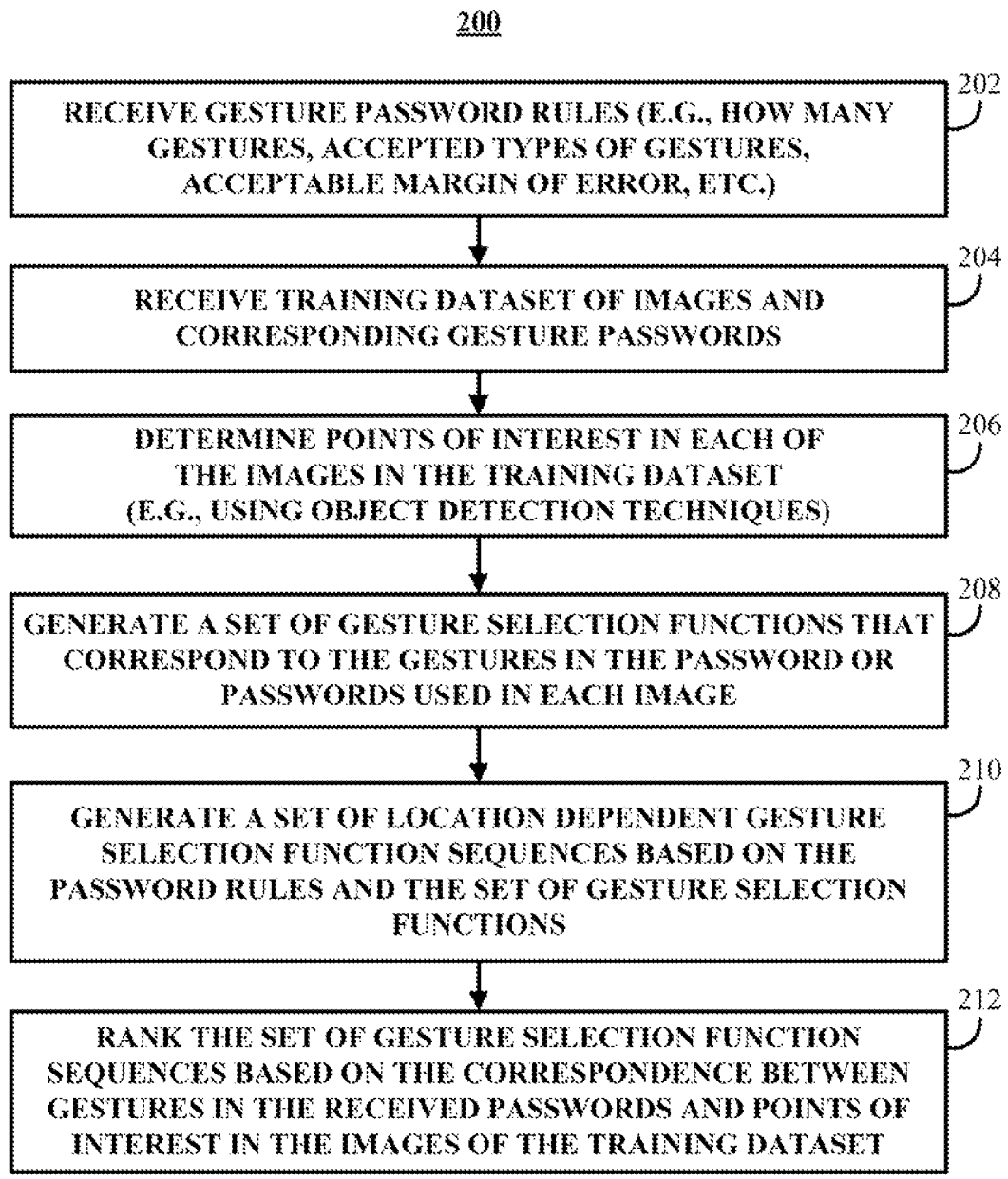
FIG. 2 shows an example of a process for training a model used in measuring quality of gesture-based passwords in accordance with some embodiments of the disclosed subject matter.

FIG. 2 shows an example 200 of a process for training a model used in measuring quality of gesture-based passwords in accordance with some embodiments of the disclosed subject matter. As shown in FIG. 2, process 200 can begin at 202 by receiving a set of gesture password rules to be used in constructing the model. Any suitable gesture password rules can be included in the received gesture password rules. In some embodiments, these rules can specify the number of gestures that must and/or can be included in a password. For example, in the case of WINDOWS 8 PICTURE PASSWORD, a password must include exactly three gestures. As another example, password rules for a gesture-based password could require a number of gestures in a particular range (e.g., at least three and no more than five gestures).

In some embodiments, the password rules can include types of gestures that are permitted. For example, in the case of WINDOWS 8 PICTURE PASSWORD, the permitted gestures include taps (e.g., indicating a particular location), straight lines (e.g., connecting to areas or points in the image), and circles (e.g., enclosing a particular area in the image). As another example, any suitable number of permitted gestures can be used and/or any gesture can be accepted between a tap and any path between two lines. In a more particular example, permitted gestures can include rectangles, triangles, crosses, exes, and/or any other suitable gesture. In some embodiments, if a non-permitted gesture is inputted it can be converted to a permitted gesture. For example, in the case of WINDOWS 8 PICTURE PASSWORD, a curved line inputted by a user can be converted into a straight line between the endpoints of the curve, a triangle or rectangle can be converted to a circle with a center and radius that is based on the dimensions of the triangle or rectangle. In some embodiments, gestures can also include a directional component. For example a line can be specified by the coordinates of the lines endpoints and the direction between the endpoints. In such an example, a line drawn from endpoint one to endpoint two is a different gesture than a line drawn from endpoint two to endpoint one.

In some embodiments, the password rules can include a tolerance for how closely an inputted password must reproduce a registered password in order to be recognized. When a password is registered (e.g., when a user is selecting a password), the coordinates of the gestures and/or any other properties of the gesture can be used to register the password. When re-entering the password, the coordinates and/or properties of the gestures in the re-entered password can be compared to the registered password information in order to determine if the re-entered password is authentic. This can verify that the user that re-entered the password "knows" the registered password and therefore is permitted access to whatever is being protected by the password.

In some embodiments, coordinates and/or other suitable attributes of the gestures in a password can be stored as coordinates that relate the gestures to an image used as the background for the password. For example, to record the gestures, process 100 can divide the longest dimension of the image corresponding the password into 100 segments and the short dimension on the same scale to create a grid (e.g., coordinates). Process 100 can then store the coordinates of the gestures. Additionally, line and circle gestures (or triangles, rectangles, etc.) can also be associated with additional information such as a direction of the movement or movements used in making the gesture. In some embodiments, the starting point of a shape gesture, such as a circle, may be ignored and the center, radius and direction of movement used to draw the circle can be used to specify the circle.

Any suitable tolerance can be used when comparing gestures of a registered password and gestures of a re-entered password (and/or a password from the ranked password dictionary described in connection with 108). For example, an inputted gesture can be compared to a registered gesture by measuring the distance between the inputted gestured and the registered gesture. This distance can be compared to a threshold. In one particular example, for a tapping gesture, the tap can be considered a match if the relationship $12-d^2 \geq 0$ is satisfied, where d can be the distance between the coordinates of the inputted tap gesture and the coordinates of the stored tap gesture. Similarly, the starting and ending points of an inputted line gesture, the center and/or radius of an inputted circle gesture and/or any other suitable attribute of an inputted gesture can be compared to a stored gesture using a similar tolerance.

Figure 3:
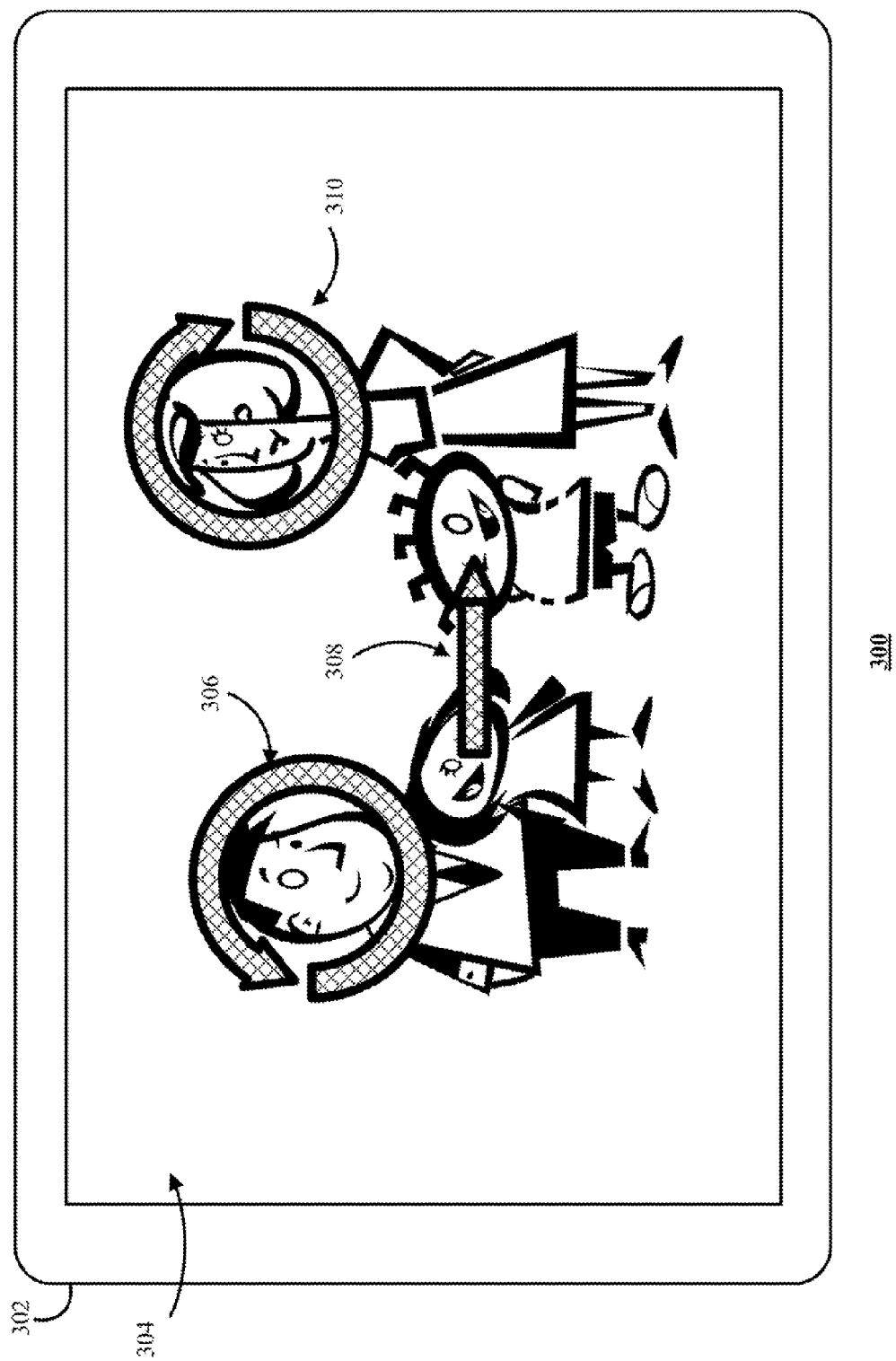
FIG. 3 shows an example of a user interface for facilitating a user to input a candidate gesture-based password in accordance with some embodiments of the disclosed subject matter

In some embodiments, a gesture can be specified by a 7-tuple $\langle g, x_1, y_1, x_2, r, d \rangle$, where: g can be the gesture type (e.g., tap, line, circle); $\langle x_1, y_1 \rangle$ can be the coordinates of a tap gesture, the beginning coordinates of a line gesture, or the center of a circle gesture; $\langle x_2, y_2 \rangle$ can be the end point of a line; r can be the radius of a circle; d can be a direction of a circle such as clockwise or counter-clockwise, which can be represented as + or −, respectively. FIG. 3, described in more detail below, shows an example 300 of a background image 304 presented by a computing device 302. A user-generated password shown in 300 includes a counterclockwise circle gesture 306 around a first face, a line gesture 308 connecting a nose of a third face and a nose of a fourth face, and a clockwise circle gesture 310 around a fourth face.

Returning to FIG. 2, at 204, process 200 can receive a training dataset of images and one or more corresponding gesture passwords for each of the images in the training dataset. The received training dataset can, for example, represent pairs of a proof of knowledge and a corresponding image, where multiple proofs of knowledge (which can be similar or dissimilar to one another) may be paired with a single image. In some embodiments, the training dataset can be collected and/or received from any suitable source. For example, process 200 can receive passwords generated by volunteers and/or any other suitable users that are instructed to input passwords on particular images without using the passwords to access anything. As another example, process 200 can receive passwords and images from users (e.g., with user's permission, when the password is no longer being used, etc.) that use the passwords to access a system or service. As yet another example, process 200 can receive passwords and corresponding images that have been previously compromised (e.g., due to past security breaches). Passwords and corresponding images can be received from any suitable source.

At 206, process 200 can determine points of interest for each of the images in the training dataset. As described above in connection with 104 of FIG. 1, process 200 can use any suitable technique for determining points of interest. For example, the Viola-Jones object detection framework, contour detection, Canny edge detection, objectness, Hough transforms, human oracles, and/or any other suitable techniques. As also described above in connection with 104 of FIG. 1, points of interest can be classified according to semantic category, color, shape, size, and/or any other suitable attributes.

At 208, process 200 can generate a set of gesture selection functions that correspond to gestures in the password or passwords used in each image. In some embodiments, a gesture selection function can be a function s that takes a gesture type from a set of gesture types G (e.g., tap, circle, line), at least one set of point of interest attributes in $2^D$ (e.g., the set of point of interest attributes), and the set of points of interest of a particular image and produces a set of gestures of the specified type that can be made in the image for points of interest having the specified attributes. Examples of point of interest attributes are described in Jermyn et al., "The design and analysis of graphical passwords," in Proceedings of the 8th USENIX Security Symposium (1999), Washington D.C., pp. 1-14, which is hereby incorporated by reference herein in its entirety. In some embodiments, gesture selection functions generated by process 200 can represent a user's thought process when selecting a particular gesture to use in a password. For example, a user may associate specific gestures used when registering a password with information that is meaningful to the user such as "circle my father's head" or "tap my mother's nose" which may not be resolvable by process 200 (e.g., because process 200 does not have access to the context of the image with respect to the user entering the password). A gesture selection function can ignore the subjective information while mimicking part of the user's thought process such as "circle a head." Using this abstracted gesture selection function, as described above in connection with 106 of FIG. 1, a gesture selection function can produce multiple gestures in a single image because subjective contextual information is not available (e.g., the gesture selection function "circle a head" generates multiple gestures when there are multiple heads in an image).

In some embodiments, these gesture selection functions can be generated for each password and image pair in the training dataset by comparing each gesture in the password to points of interest in the image. Process 200 can compare the gesture and the point of interest, for example, based on the coordinates and sizes of the gesture and the points of interest respectively. For example, a circle gesture having center coordinates (10, 10) and radius five can be compared to points of interest near coordinates (10, 10). As another example, a tap gesture having coordinates (25, 80) can be compared to point of interest near coordinates (25, 80). In a more particular example, the coordinates of the center of a circle gesture can be compared to the coordinates of the center of a nearby point of interest and the radius of the circle gesture can be compared to half of the height and width of the nearby point of interest. In some embodiments, if there is a match, process 200 can create a gesture selection function based on the gesture type, the attributes of the matching point of interest (or points of interest in the case of a line). In some embodiments, process 200 can use any tolerance when determining which points of interest are nearby and which points of interest are a match to a gesture (in size and/or location) based on any suitable tolerance. For example, the tolerance described above in connection with 202 can be used by process 200 when determining whether a gesture is a match with a point of interest. In some embodiments, a gesture selection function can correspond to a portion of a relatively large point of interest. For example, a first gesture selection function can correspond to an eye that is included as part of a face, and a separate gesture selection function can correspond to the face that includes the eye. As another example, a first gesture selection function can correspond to a portion of a point of interest where the portion is not identified as a separate point of interest. In a more particular example, a gesture corresponding to a portion of car point of interest can correspond to a particular portion of the car even though process 200 may not recognize separate portions of the car as a separate point of interest. In such cases, process 200 can associate a gesture selection function with a point of interest attribute denoting a particular portion of a larger point of interest, such as center, left, right, top, or bottom.

At 210, process 200 can generate a set of location dependent gesture selection function sequences based on the password rules and the set of gesture selection functions. These gesture selection function sequences can, for example, mimic a proof of knowledge that represents a set of gestures in a given image (e.g., a user-selected image received as described above in connection with 102 of FIG. 1) without prior knowledge of the image or knowledge specific to the user selecting the proof of knowledge. In some embodiments, the gesture selection functions generated at 208 can be assembled as various gesture selection function sequences. For example, the gesture selection functions generated at 208 can be compared and duplicates can be removed. The de-duplicated gesture selection functions can then make up a set of gesture selection functions S, where each gesture selection function can be a member s of the set S. In some embodiments, gesture selection function sequences can be generated by traversing a three layer network (e.g., where the password length is three gestures) where each layer includes the set of gesture selection functions S. More particularly, in some embodiments, process 200 can generate a list of all possible gesture selection function sequences based on the gesture selection functions generated at 208 and the password rules received at 202. For example, if the password must be three gestures, process 200 can identify every permutation of three gesture selection functions s included in set S. A gesture selection function sequence can be represented as $\vec{s}$ which can be a member of a set of all gesture selection function sequences $\vec{S}$ generated from the training dataset. For example, if process 200 generates four gesture selection functions $s_1, \ldots, s_4$ from the training dataset of passwords and images, the gesture selection function sequences can include all length three permutations of gesture selection functions $s_1, \ldots, s_4$. This can result in sixty four gesture selection functions sequences $\vec{s}_1, \ldots, \vec{s}_4$. In some embodiments, process 200 can use the password rules received at 202 to eliminate certain gesture selection function sequences that are not permitted under the rules. For example, if three gestures of the same type are not allowed as a password, then process 200 can eliminate gesture selection function sequences corresponding to this combination from the set $\vec{S}$, as they will not be allowed as passwords and therefore cannot be guessed. Additionally, if different length passwords are permitted, process 200 can generate gesture selection function sequences corresponding to each password length. For example, in the example described above with four gesture selection functions, if length four passwords are permitted, process 200 can generate a set of length-three sequences $\vec{S}^3$ that includes 64 gesture selection functions sequences, and a set of length-four sequences $\vec{S}^4$ that includes 256 gesture selection functions. In this case, the set $\vec{S}$ can include 320 gesture selection sequences.

At 212, process 200 can rank the set of gesture selection function sequences based on correspondence between gestures in the received passwords and points of interest in the images of the training dataset. Any suitable technique or combination of techniques can be used to rank the set of gesture selection function sequences $\vec{S}$.

In some embodiments, process 200 can rank the set of gesture selection function sequences by minimizing the expected number of sequences in the ranked list that need to be tested to guess the password for a random selection of a particular password-image pair from the training dataset received at 202. This is sometimes referred to herein as Best-Cover sequence list ranking for ranking a set of gesture selection function sequences. Using BestCover, a set of gesture selection function sequences $\vec{s}_1, \ldots, \vec{s}_1$, can be ranked based on the received passwords (which can be represented as gesture passwords $\vec{\pi}_1, \ldots, \vec{\pi}_k$) for the received images (which can be represented as images $p_1, \ldots, p_k$) and the sets of points of interest (which can be represented as $\theta_1, \ldots, \theta_k$) generated for each corresponding image $p_1, \ldots, p_k$. In some embodiments, these parameters can satisfy a condition such that gesture selection sequences $\vec{s}_1, \ldots, \vec{s}_1$, having inputs of $\theta_1, \ldots, \theta_k$ produce at least passwords $\vec{\pi}_k, \ldots, \vec{\pi}_k$. In some embodiments, multiple gesture selection function sequences can be identified from a single image and password combination (e.g., as described above in connection with 210) n can be greater than or equal to k. Additionally or alternatively, in some embodiments, where multiple passwords are received in connection with a single image, each password (e.g., $\vec{\pi}_k$) can be separately associated with the image (e.g., $p_k$) and/or the points of interest of the image ($\theta_k$). For example, two or more sets of points of interest ($\theta_k$) may be similar or identical because they represent the same image.

In some embodiments, the gesture selection function sequences can be ranked to minimize the mathematical expectation $\mathbb{E}$ of the number of passwords that would have to be guessed for any randomly selected image from the training dataset. This constraint on the ranking can be expressed as, for example, $\mathbb{E}(\min\{i: \vec{s}_i(\theta_r) \ni \vec{\pi}_r\})$, where $\vec{s}_1 = \text{order}^{-1}(i)$ and the expectation is taken with respect to a random choice of $r \leftarrow \{1, \ldots, k\}$.

As described above in connection with FIG. 1, different selection functions s and different selection function sequences $\vec{s}$ can generate the same gestures and/or the same passwords. For example, a first gesture selection function interpreted by process 200 as "tap a red object" and a second gesture selection function interpreted as "tap a ball" can result in the same gesture for an image that includes a red ball. This possible overlap can result in the computation for determining the rank that will minimize the above relationship being computationally difficult. Accordingly, an approximated ranked list can be calculated using the BestCover algorithm as follows:

---

Algorithm 1: BestCover(($\vec{s}_1, \ldots, \vec{s}_n$), ($\vec{\pi}_1, \ldots, \vec{\pi}_n$))

for i = 1..n do
 | $T_{\vec{s}_i} \leftarrow \{k : \vec{s}_i(\theta_k) \ni \vec{\pi}_k\}$;
end
$\vec{S}' \leftarrow \{\vec{s} : |T_{\vec{s}}| > 0\}$;
for i = 1..$|\vec{S}'|$ do
 | order$^{-1}$(i) $\leftarrow \vec{s}_k$, that $T_{\vec{s}_k}$ has most elements that are not
 | included in $\bigcup_{i' < i}$ order$^{-1}$(i'):
end
return order

---

In some embodiments, for example, a first set of passwords ($T_{\vec{s}_i}$) can be generated for each gesture selection function sequence ($\vec{s}_i$) that includes passwords that can be generated from each gesture selection function sequence $\vec{s}_i$ that, when used to generate passwords for points of interest (e.g., all sets $\theta_k$), generate a set of passwords that includes the password ($\vec{\pi}_k$) associated with those points of interest. A set ($\vec{S}'$) of all gesture selection functions ($\vec{s}$) that produce at least one password in the training dataset across all sets of points of interest (e.g., for all $T_{\vec{s}}$ for which the number of elements is greater than zero. Then, the first gesture selection function sequence can be the gesture selection function sequence that generates the most passwords in training dataset (e.g., based on the cardinality of $T_{\vec{s}_i}$). The remaining gesture selection function sequences (e.g., those gesture selection function sequences that did not generate any passwords in the training dataset), can be placed after the sequences in $\vec{S}'$ in descending order based on the number of passwords that the sequences generate that are not generated by the gesture selection functions in $\vec{S}'$.

In some embodiments, process 200 can rank the set of gesture selection function sequences based at least in part on the distribution of point of interest attributes in the images in the training dataset. This distribution can be used in conjunction with the relative frequency at which points of interest with those attributes were associated with a gesture included in a password in the training dataset. This is sometimes referred to herein as Unbiased sequence list ranking for ranking a set of gesture selection function sequences.

In some embodiments, process 200 can use Unbiased to rank gesture selection function sequences based at least in part on normalizing the occurrences of gesture selection functions based on the occurrence of the points of interest corresponding to those gesture selection functions in the images in the training dataset. For example, if a point of interest with a particular type of attribute is not included in an image (e.g., an image received at 102 of FIG. 1), the user cannot select a point of interest having that attribute as the basis for a gesture in a gesture-based password. In a more particular example, for a gesture selection function interpreted by process 200 as "tap the red ball," the probability of a gesture corresponding to "tap the red ball" appearing in a password for an image that does not include a red ball is zero. Process 200 can rank the gesture selection function sequences based on the assumption that each gesture selection function in the sequence is independent of the other gesture selection functions in the sequence. For example, using Unbiased, process 200 can assume that the probability of a particular gesture corresponding to a particular point of interest appearing in a second position in a password is not based on the gestures and/or points of interest that came before in the password. In some embodiments, process 200 can calculate an approximate probability that the attributes associated with gesture selection functions included in a sequence of gesture selection functions exist in the set of points of interest in all images in the training dataset. This probability can be expressed as follows:

$$Pr(\vec{s}_k \mid D_{\vec{s}_k} \subseteq \theta) = Pr(s_1 s_2 s_3 \mid D_{s_1} \subseteq \theta \wedge D_{s_2} \subseteq \theta \wedge D_{s_3} \subseteq \theta) \quad (1)$$
$$= Pr(s_1 \mid D_{s_1} \subseteq \theta) \times Pr(s_2 \mid D_{s_2} \subseteq \theta) \times Pr(s_3 \mid D_{s_3} \subseteq \theta).$$

For each gesture selection function $s_i$ in the set S, process 200 can compute a probability that a gesture corresponding to a particular gesture selection function $s_1$ appears in a password in cases where at least one point of interest having a corresponding attribute (or attributes) are included in the training set of images. In some embodiments, such a probability can be expressed as follows:

$$Pr(s_i | D_{s_i} \subseteq \theta) = \frac{\sum_{j=1}^{n} \text{count}(D_{s_i}, \vec{\pi_j})}{\sum_{j=1}^{n} \text{count}(D_{s_i}, \theta_j)},, \quad (2)$$

where $\sum_{j=1}^{n} \text{count}(D_{s_i}, \vec{\pi_j})$ can represent the number of gestures in passwords of the training set that correspond to a point of interest having a same attribute as the point of interest corresponding to $s_i$, and $\sum_{j=1}^{n} \text{Count}(D_{s_i}, \theta_j)$ can represent the number of points of interest in the training dataset that share a same attribute as the point of interest corresponding to $s_i$.

In some embodiments, process 200 can use Unbiased to rank the gesture selection function sequences generated, for example, in connection with 210 by ranking each sequence according to the probability calculated using equation (1). In some embodiments, a ranked list can be calculated using the Unbiased algorithm as follows:

---
Algorithm 2: Unbiased(S)

for s ∈ S do
  | Compute Pr(s|$D_s \subseteq \theta$) with Equation 2;
end
for $\vec{s} \in \vec{S}$ do
  | Compute Pr($\vec{s}$|$D_{\vec{s}} \subseteq \theta$) with Equation 1;
end
for i = 1..|$\vec{S}$| do
  | order$^{-1}$ (i)← $\vec{s}_k$, that Pr($\vec{s}_k$ |$D_{\vec{s}_k} \subseteq \theta$) holds the i-th position
  | in the descending ordered Pr($\vec{s}$|$D_{\vec{s}} \subseteq \theta$) list;
end
return order

---

FIG. 3 shows an example 300 of a user interface of computing device 302 for facilitating a user to enter a candidate gesture-based password in accordance with some embodiments of the disclosed subject matter. As shown in FIG. 3, background image 304 includes four people (two adults and two children). As described above in connection with 104 of FIG. 1 and 206 of FIG. 2, process 100 or process 200 can determine points of interest in image 304. For example, points of interest can be determined that correspond to four faces, eight eyes, four noses, four mouths, and four people. In some embodiments, process 100 can provide a strength measurement for the candidate gesture-based password that includes gestures 306-310.

Figure 4:
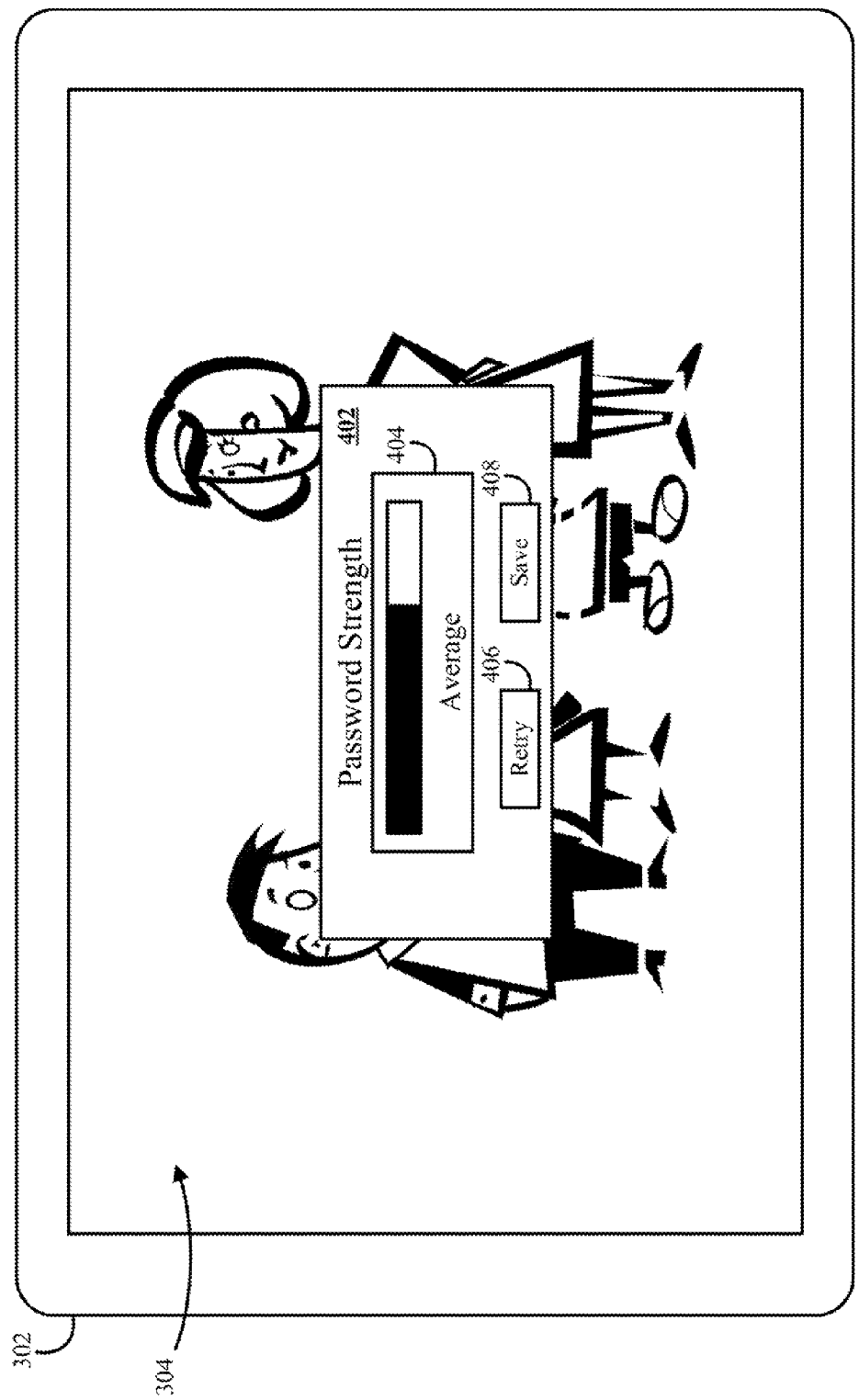
FIG. 4 shows an example of a user interface for presenting a password strength of a candidate gesture password in accordance with some embodiments of the disclosed subject matter.

FIG. 4 shows an example 400 of a user interface of computing device 302 for presenting a password strength of a candidate gesture password in accordance with some embodiments of the disclosed subject matter. As shown in FIG. 4, user interface 400 can include a window 402 which can include a visualization of a password strength of a gesture-based password (e.g., a password that includes gestures 306-310). Window 402 can also include a retry element 406 which can be selected to initiate a process for choosing a new password, and a save element 408 which can be selected to register the candidate password as the password for accessing information on computing device 302.

Figure 5:
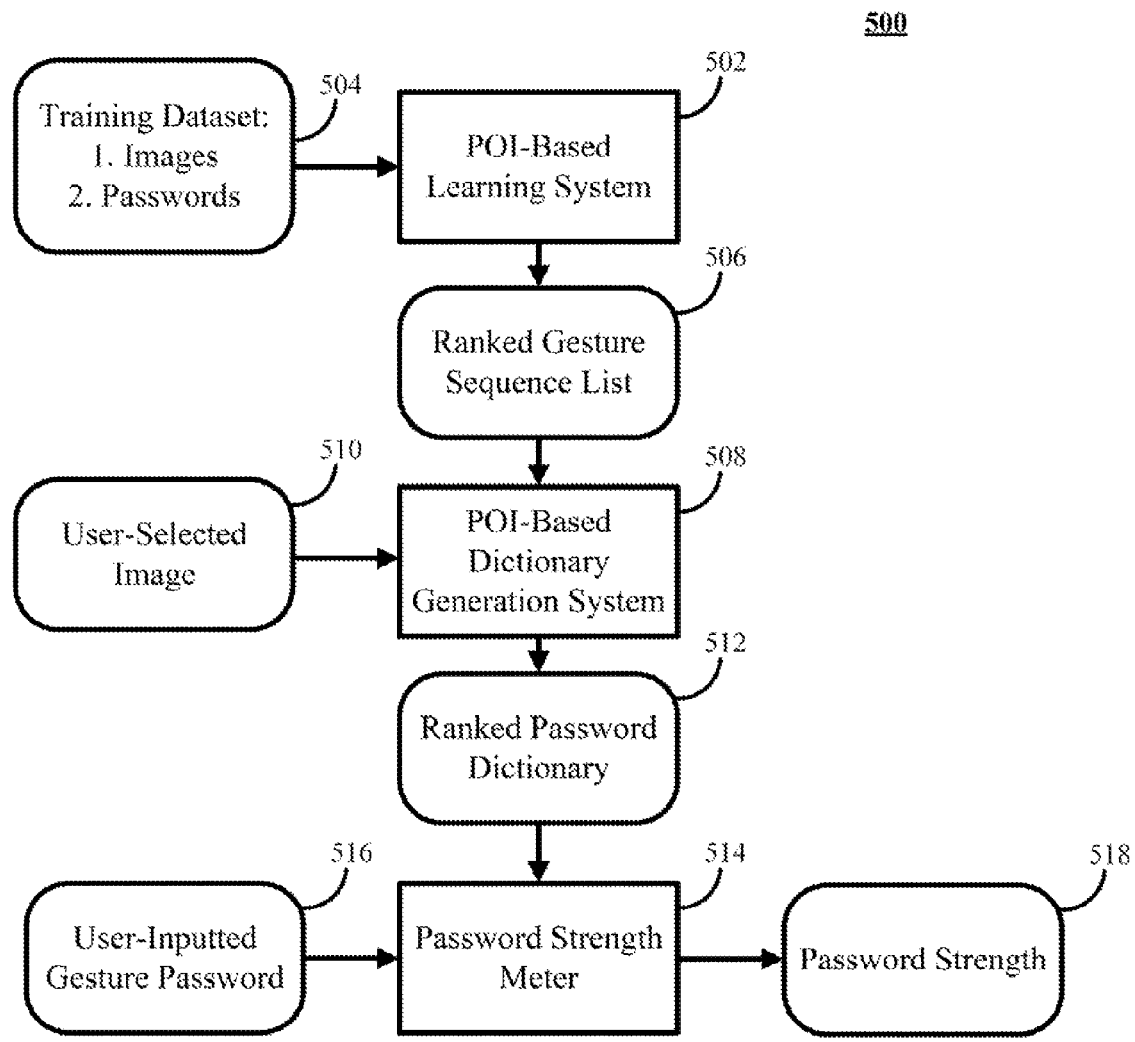
FIG. 5 shows an example of a system for training a model for measuring quality of gesture-based passwords and for measuring gesture-based passwords in accordance with some embodiments of the disclosed subject matter.

FIG. 5 shows an example of a system 500 for training a model for measuring quality of gesture-based passwords and for measuring quality of gesture-based passwords in accordance with some embodiments of the disclosed subject matter. As shown in FIG. 5, system 500 can include a point-of-interest-based learning system 502 which can receive a training dataset 504 that includes images and corresponding gesture-based passwords. For example, point-of-interest-based learning system 502 can execute process 200 using training dataset 502, and can output a ranked gesture selection function sequence list (e.g., as described above in connection with 212 of FIG. 2).

In some embodiments, system 500 can include a point-of-interest-based dictionary generation system 508 which can receive a user-selected image 510 and ranked gesture selection function list 506 as inputs. Point-of-interest-based dictionary generation system 508 can generate a ranked password dictionary 512 based on user-selected image 510 and ranked gesture selection function list 506 (e.g., as described above in connection with 108 of FIG. 1).

In some embodiments, system 500 can include a password strength meter 514 which can receive a user inputted gesture password 516 and the ranked password dictionary 512. Password strength meter 514 can compare user-inputted gesture password 516 to ranked password dictionary 512 to determine a relative strength of user-inputted gesture password 516, and can output a password strength measure 518 (e.g., as described above in connection with 116 of FIG. 1).

Figure 6:
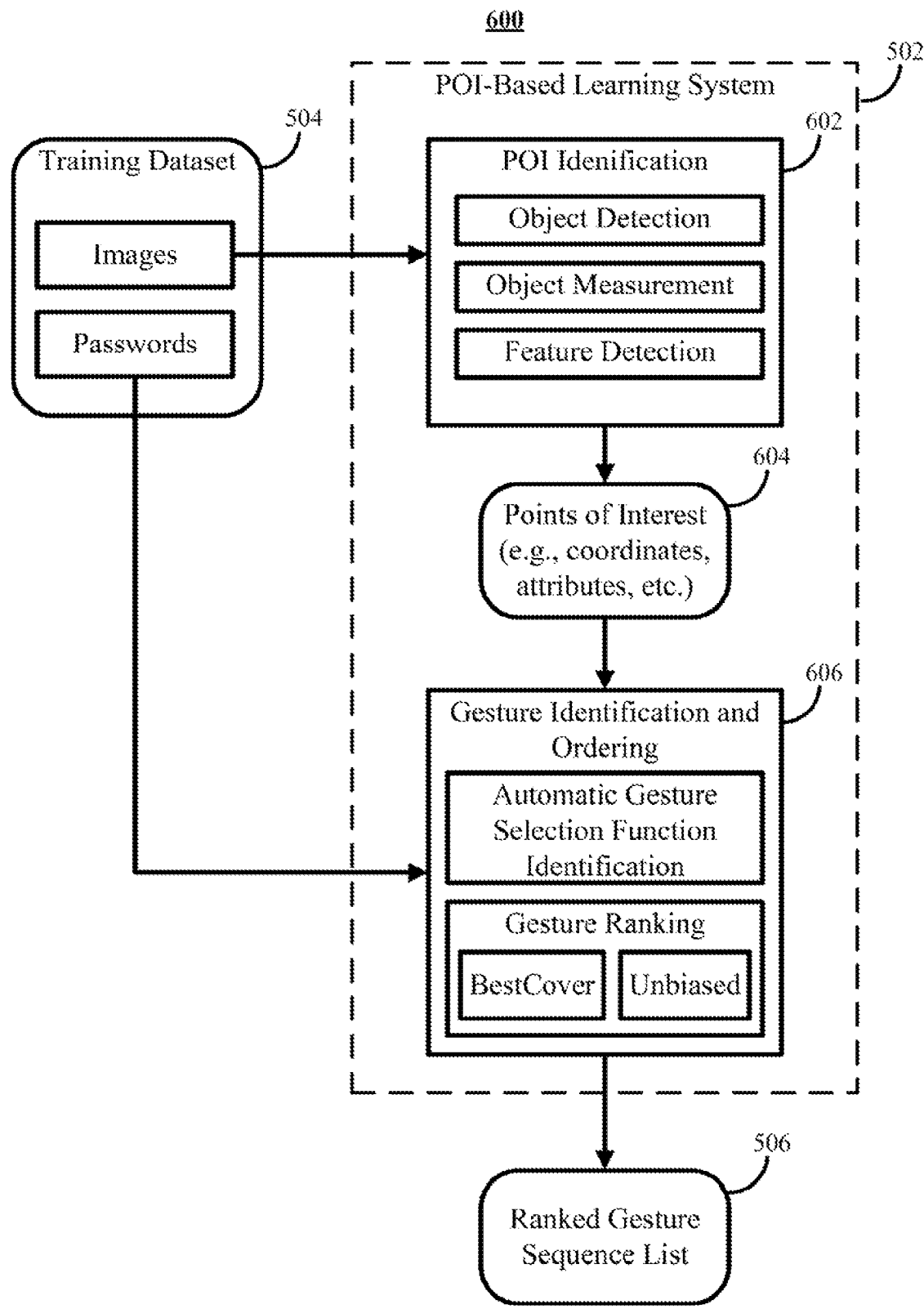
FIG. 6 shows an example of a point-of-interest-based learning system of FIG. 5 in accordance with some embodiments of the disclosed subject matter.

FIG. 6 shows an example 600 of point-of-interest-based learning System 502 in accordance with some embodiments of the disclosed subject matter. As shown in FIG. 6, POI-based learning system 502 can include a point of interest identification module 602 that can receive images from training dataset 504 and extract points of interest using one or more object identification techniques (e.g., as described above in connection with 104 of FIG. 1 and 208 of FIG. 2). POI identification module 602 can output points of interest 604 corresponding to images in training dataset 504.

In some embodiments, POI-based learning system 502 can include a gesture identification and ordering module 606 that can receive points of interest 604 and passwords from training dataset 504. Gesture identification and ordering module 606 can use the password information and points of interest 604 to automatically identify gesture selection functions for training dataset 504 (e.g., as described in connection with 208) and can generate a ranked list 506 of gesture selection function identification sequences using a ranking algorithm (e.g., as described in connection with 210-212 of FIG. 2).

Figure 7:
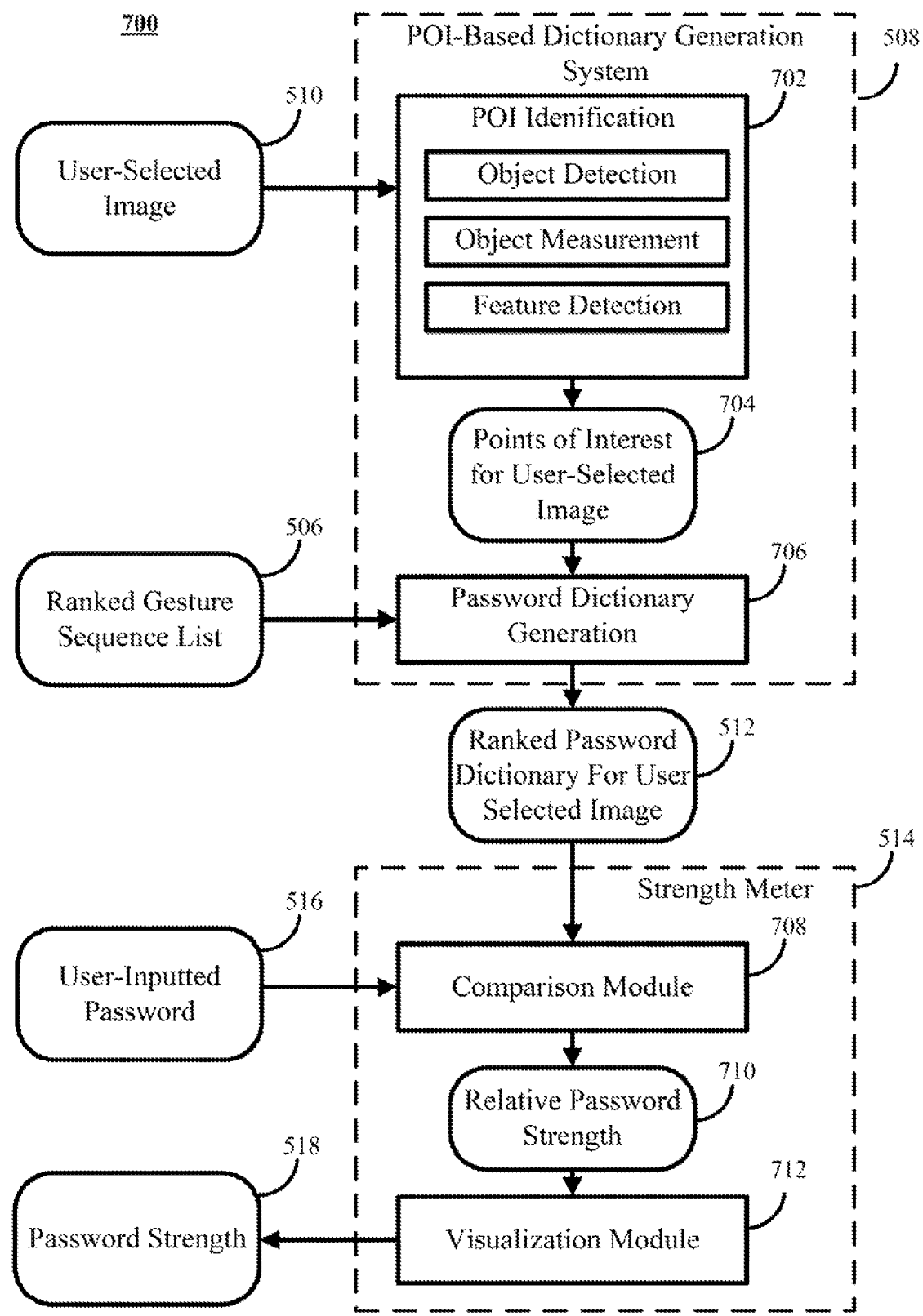
FIG. 7 shows an example of a point-of-interest-based dictionary generation system and password strength meter of FIG. 5 in accordance with some embodiments of the disclosed subject matter.

FIG. 7 shows an example 700 of point-of-interest-based dictionary generation system 508 and password strength meter 514 in accordance with some embodiments of the disclosed subject matter. As shown in FIG. 7, point-of-interest-based dictionary generation system 508 can include a point of interest detection module 702 which can be similar to and/or perform similar functions to point of interest detection module 602. Point of interest detection module 702 can receive user-selected image 510 and can output points of interest 704 for user-selected image 510 (e.g., as described above in connection with 104 of FIG. 1). Point-of-interest-based dictionary generation system 508 can further include a password dictionary generation module 706 which can receive ranked gesture selection function sequence list 506 (e.g., as generated using BestCover, Unbiased, and/or any other suitable technique for ranking gesture selection function sequences) and can output ranked password dictionary 512.

In some embodiments, as shown in FIG. 7, strength meter 514 can include a comparison module which can compare user-inputted gesture password 516 to ranked password dictionary 512 which was generated for user-selected image 510. Comparison module 708 can output a relative password strength 710 of user-inputted password 516 (e.g., as described in connection with 112 of FIG. 1).

In some embodiments, strength meter 514 can include a visualization module 712 which can receive relative password strength 710 and can output and/or present a representation of password strength 518 (e.g., as described in connection with 116 of FIG. 1 and FIG. 4).

Figure 8:
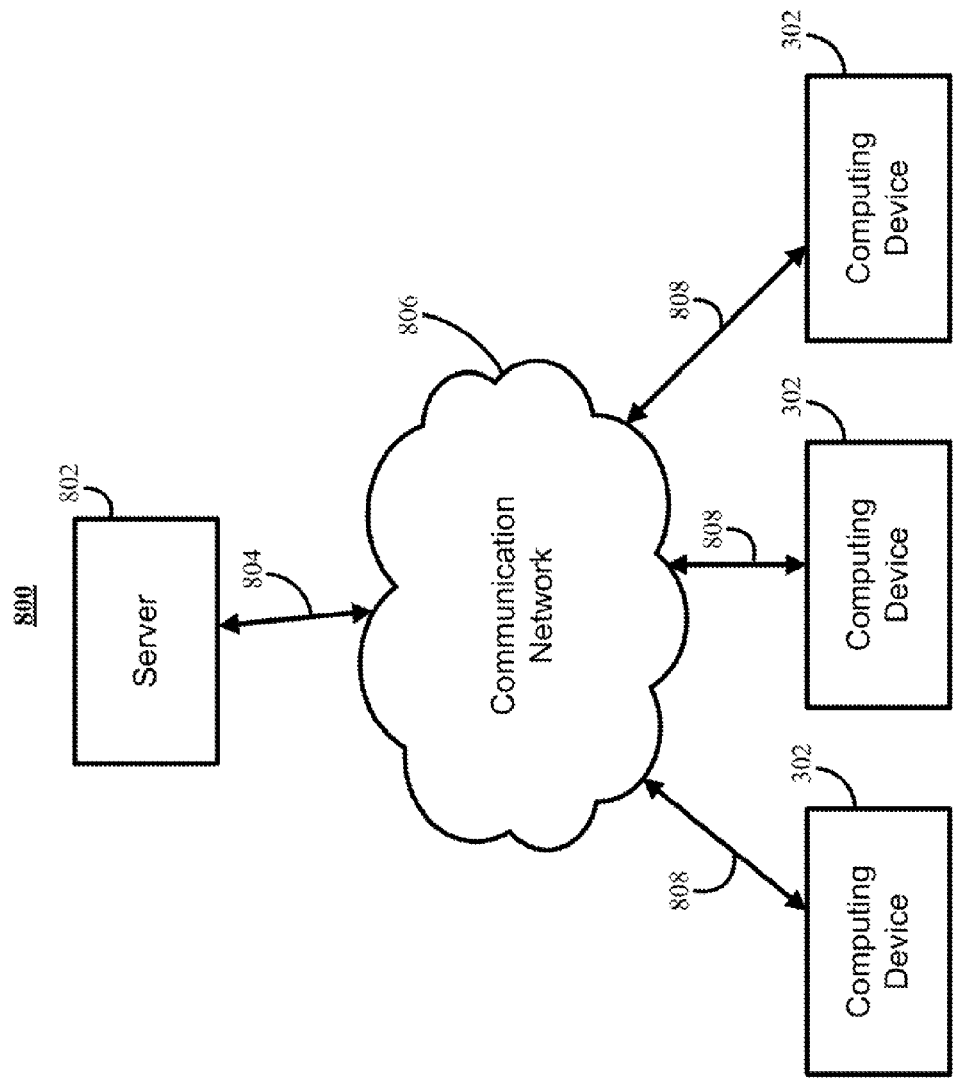
FIG. 8 shows an example of a schematic diagram of a system suitable for implementation of mechanisms described herein for measuring quality of gesture-based passwords in accordance with some embodiments of the disclosed subject matter.

FIG. 8 shows an example 800 of a generalized schematic diagram of a system in which the mechanisms for measuring quality of gesture-based passwords as described herein can be implemented in accordance with some embodiments. As illustrated, system 800 can include one or more computing devices 302. Computing devices 302 can be local to each other or remote from each other. Computing device 302 can be connected by one or more communications links 808 to a communications network 806 that can be linked via a communications link 804 to one or more servers 802.

System 800 can include one or more servers 802. Server 802 can be any suitable server for providing access to the mechanisms described herein for measuring quality of gesture-based passwords, such as a processor, a computer, a data processing device, or any suitable combination of such devices. For example, the mechanisms for measuring quality of gesture-based passwords can be distributed into multiple backend components and multiple frontend components and/or user interfaces. In a more particular example, backend components, such as mechanisms for training a model for measuring quality of gesture-based passwords (e.g., as described in connection with process 200 of FIG. 2 and POI-based learning system 502 in connection with FIGS. 5 and 6), mechanisms for determining points of interest in a user-selected image (e.g., as described above in connection with 104 of FIG. 1, 206 of FIG. 2 and POI identification modules 602 and 702 in connection with FIGS. 6 and 7), and/or mechanisms for measuring quality of gesture-based passwords (e.g., as described above in connection with FIGS. 1 and 7) can be performed on one or more servers 702. In another particular example, frontend components, such as presentation of a user interface, mechanisms for determining points of interest in a user-selected image (e.g., as described above in connection with 104 of FIG. 1, 206 of FIG. 2 and POI identification modules 602 and 702 in connection with FIGS. 6 and 7), and/or mechanisms for measuring quality of gesture-based passwords (e.g., as described above in connection with FIGS. 1 and 7), can be performed on one or more computing devices 302. In some embodiments, the training dataset can be comprised entirely or partially of images and/or passwords used on a single computing device. For example, a model for measuring quality of gesture-based passwords can be generated and/or updated using data from only a user's device and can learn over time which passwords one or more users of the device are most likely to choose. In some embodiments, any of modules 502, 508, 514, 602, 606, 702, 706 and 708 can be hardware-based modules, software-based modules, and/or some combination thereof, which can be included in a local system, a remote system, and/or can be included as part of a virtualized infrastructure such as a distributed computing system (e.g., "the cloud").

In some embodiments, each of computing devices 302 and servers 802 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 302 can be implemented as a smartphone or other cellular telephone, a tablet computer, a personal digital assistant, a portable music player, a portable video player, a handheld game console, a laptop computer, a personal computer, a television, a game console, and/or any other suitable computing device.

Communications network 806 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 804 and 808 can be any communications links suitable for communicating data among computing devices 302 and servers 802, such as network links, dial-up links, wireless links, hard-wired links, optical links, infrared links, any other suitable communications links, and/or any suitable combination of such links.

Figure 9:
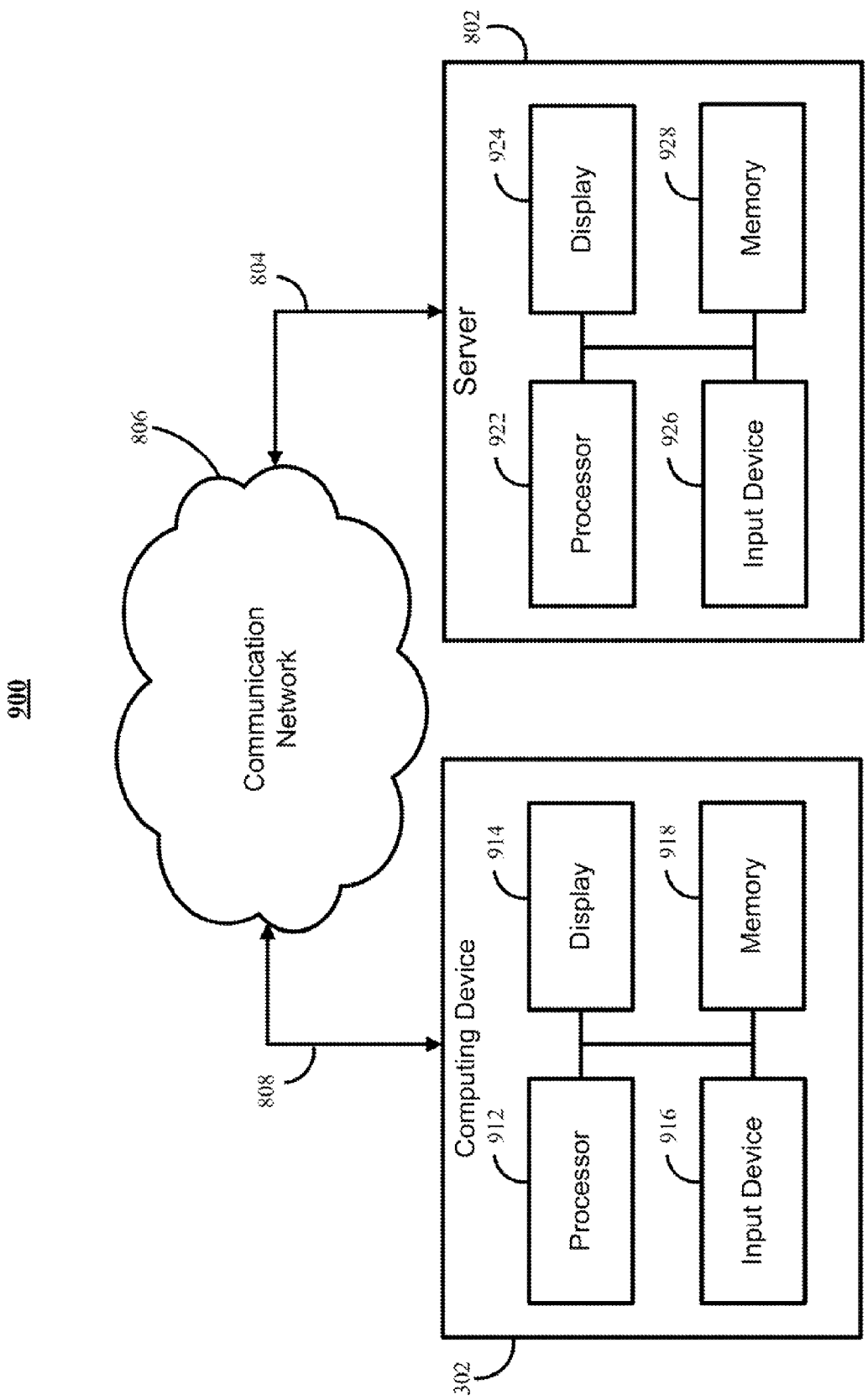
FIG. 9 shows an example of a computing device and a server of FIG. 8 that can be used in accordance with some embodiments of the disclosed subject matter.

FIG. 9 illustrates an example 900 of hardware that can be used to implement one of computing devices 302 and servers 802 depicted in FIG. 8 in accordance with some embodiments of the disclosed subject matter. Referring to FIG. 9, computing device 302 can include a hardware processor 912, a display 914, an input device 916, and memory 918, which can be interconnected. In some embodiments, memory 918 can include a storage device (such as a non-transitive computer-readable medium) for storing a computer program for controlling hardware processor 912.

Hardware processor 912 can use the computer program to present on display 914 content and/or a user interface that allows a user to access the mechanisms described herein and to send and receive data through communications link 808. It should also be noted that data received through communications link 808 or any other communications links can be received from any suitable source. In some embodiments, hardware processor 912 can cause data to be sent and received through communications link 808 and/or any other communication links using, for example, a transmitter, receiver, transmitter/receiver, transceiver, or any other suitable communication device. Input device 916 can be a computer keyboard, a microphone, a mouse, a trackball, a keypad, a remote control, any other suitable input device, and/or any suitable combination thereof. Additionally or alternatively, input device 916 can include a touch screen display 414 that can receive input (e.g. using a finger, a stylus, or the like).

Server 802 can include a hardware processor 922, a display 924, an input device 926, and memory 928, which can be interconnected. In some embodiments, memory 928 can include a storage device for storing data received through communications link 804 and/or through other links, and processor 922 can receive commands and values transmitted by one or more users of, for example, computing device 302. The storage device can further include a server program for controlling hardware processor 822.

The mechanisms described herein for measuring quality of gesture-based passwords can be implemented in computing devices 302 and/or server 802 as software, firmware, hardware, and/or any suitable combination thereof.

In some embodiments, server 802 can be implemented as one server or can be distributed as any suitable number of servers. For example, multiple servers 802 can be implemented in various locations to increase reliability, function of the mechanisms described herein, and/or the speed at which the server can communicate with computing devices 302.

In some embodiments, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by computing device 302 and/or server 802 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1 and 2 can be executed or performed in any order or sequence not limited to the order and sequence shown and described in the figures. Also, some of the above steps of the processes of FIGS. 1 and 2 can be executed or performed substantially simultaneously where appropriate or in parallel to reduce latency and processing times. Furthermore, it should be noted that FIGS. 1 and 2 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for measuring quality of gesture-based passwords are provided.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is limited only by the claims that follow. Features of the disclosed embodiments can be combined and rearranged in various ways.

What is claimed is:

1. A method for measuring gesture-based password quality, the method comprising:
receiving, using a hardware processor, a first image;
receiving a proposed gesture-based password associated with the first image;
identifying a plurality of points of interest in the received image, wherein the each of the plurality of points of interest is associated with at least one point of interest attribute;
receiving a gesture selection function sequence,
wherein the gesture selection function sequence comprises a plurality of gesture selection functions,
wherein each gesture selection function is associated with a gesture type of a plurality of gesture types and at least one point of interest attribute, and
wherein receiving the gesture selection function sequence comprises receiving a ranked list of gesture selection function sequences including a plurality of gesture selection function sequences ranked based on a probability that a user will use a password generated by the gesture selection function sequence as the proposed password;
determining that a subset of the plurality of points of interest in the received image have point of interest attributes that correspond to attributes associated with the gesture selection functions of the gesture selection function sequence;
generating a possible password for the first image based on the gesture selection functions in the gesture selection function sequence in response to determining that the subset of the plurality of points of interest correspond to the attributes associated with the gesture selection functions included in the particular gesture selection function sequence;
determining whether the proposed password matches the possible password;
determining a relative strength of the proposed password based at least in part on the determination of whether the proposed password matches the possible password; and
causing the relative strength of the proposed password to be presented,
wherein the proposed password includes at least three ordered gestures each of which is associated with a gesture type of the plurality of gesture types and at least one location in the first image, and
wherein the proposed password includes at least three ordered gestures each of which is associated with a gesture type of the plurality of gesture types and at least one location in the first image.

2. The method of claim 1, further comprising:
generating a plurality of possible passwords that represent simulated proofs of knowledge for the first image based on the gesture selection functions in each of the plurality of gesture selection function sequences, wherein the possible password is generated as one of the plurality of possible passwords;
ranking the plurality of possible passwords based at least in part on a ranking of the gesture selection function sequence used to create each of the plurality of possible passwords; and
wherein determining a relative strength of the proposed password, which represents a proof of knowledge of the first image, comprises determining whether the proposed password matches any one of the plurality of possible passwords by leveraging the simulated proofs of knowledge, and determining a rank of a matching password of the plurality possible passwords in response to determining that the proposed password matches one of the plurality of the plurality of passwords.

3. The method of claim 1, wherein determining whether the proposed password matches the possible password comprises:

comparing the ordered gestures of the proposed password and the ordered gestures of the possible password;

determining whether the types of corresponding ordered gestures of the proposed password and possible password, respectively, are the same; and determining whether the location of the corresponding ordered gestures are within a threshold distance.

4. The method of claim 1, wherein the at least one point of interest attributes are descriptive of at least one of the following: a semantic category of the point of interest; a shape of the point of interest; a color of the point of interest; and a size of the point of interest.

5. The method of claim 1, wherein identifying a plurality of points of interest in the image data of the first image comprises using one or more object detection techniques to identify point of interest in the first image data.

6. A system for measuring gesture-based password quality, the system comprising:
 a hardware processor programmed to:
  receive a first image;
  receive a proposed gesture-based password associated with the first image;
  identify a plurality of points of interest in the received image, wherein the each of the plurality of points of interest is associated with at least one point of interest attribute;
  receive a gesture selection function sequence,
   wherein the gesture selection function sequence comprises a plurality of gesture selection functions,
   wherein each gesture selection function is associated with a gesture type of a plurality of gesture types and at least one point of interest attribute, and
   wherein receiving the gesture selection function sequence comprises receiving a ranked list of gesture selection function sequences including a plurality of gesture selection function sequences ranked based on a probability that a user will use a password generated by the gesture selection function sequence as the proposed password;
  determine that a subset of the plurality of points of interest in the received image have point of interest attributes that correspond to attributes associated with the gesture selection functions of the gesture selection function sequence;
  generate a possible password for the first image based on the gesture selection functions in the gesture selection function sequence in response to determining that the subset of the plurality of points of interest correspond to the attributes associated with the gesture selection functions included in the particular gesture selection function sequence;
  determine whether the proposed password matches the possible password;
  determine a relative strength of the proposed password based at least in part on the determination of whether the proposed password matches the possible password; and
  cause the relative strength of the proposed password to be presented,
  wherein the proposed password includes at least three ordered gestures each of which is associated with a gesture type of the plurality of gesture types and at least one location in the first image, and
  wherein the proposed password includes at least three ordered gestures each of which is associated with a gesture type of the plurality of gesture types and at least one location in the first image.

7. The system of claim 6, wherein the hardware processor is further configured to:
 generate a plurality of possible passwords that represent simulated proofs of knowledge for the first image based on the gesture selection functions in each of the plurality of gesture selection function sequences, wherein the possible password is generated as one of the plurality of possible passwords;
 ranking the plurality of possible passwords based at least in part on a ranking of the gesture selection function sequence used to create each of the plurality of possible passwords; and
 wherein determining a relative strength of the proposed password, which represents a proof of knowledge of the first image, comprises determining whether the proposed password matches any one of the plurality of possible passwords by leveraging the simulated proofs of knowledge, and determining a rank of a matching password of the plurality possible passwords in response to determining that the proposed password matches one of the plurality of the plurality of passwords.

8. The system of claim 6, wherein the hardware processor is further programmed to:
 compare the ordered gestures of the proposed password and the ordered gestures of the possible password;
 determine whether the types of corresponding ordered gestures of the proposed password and possible password, respectively, are the same; and
 determine whether the location of the corresponding ordered gestures are within a threshold distance.

9. The system of claim 6, wherein the at least one point of interest attributes are descriptive of at least one of the following: a semantic category of the point of interest; a shape of the point of interest; a color of the point of interest; and a size of the point of interest.

10. The system of claim 6, wherein the hardware processor is further configure to use one or more object detection techniques to identify point of interest in the first image data.

11. A non-transitory computer-readable medium containing computer executable instructions that, when executed by a processor, cause the processor to perform a method for measuring gesture-based password quality, the method comprising:
 receiving a first image;
 receiving a proposed gesture-based password associated with the first image;
 identifying a plurality of points of interest in the received image, wherein the each of the plurality of points of interest is associated with at least one point of interest attribute;
 receiving a gesture selection function sequence,
  wherein the gesture selection function sequence comprises a plurality of gesture selection functions,
  wherein each gesture selection function is associated with a gesture type of a plurality of gesture types and at least one point of interest attribute, and
  wherein receiving the gesture selection function sequence comprises receiving a ranked list of gesture selection function sequences including a plurality of gesture selection function sequences ranked based on a probability that a user will use a password generated by the gesture selection function sequence as the proposed password;
 determining that a subset of the plurality of points of interest in the received image have point of interest attributes that correspond to attributes associated with the gesture selection functions of the gesture selection function sequence;

generating a possible password for the first image based on the gesture selection functions in the gesture selection function sequence in response to determining that the subset of the plurality of points of interest correspond to the attributes associated with the gesture selection functions included in the particular gesture selection function sequence;

determining whether the proposed password matches the possible password;

determining a relative strength of the proposed password based at least in part on the determination of whether the proposed password matches the possible password; and causing the relative strength of the proposed password to be presented, wherein the proposed password includes at least three ordered gestures each of which is associated with a gesture type of the plurality of gesture types and at least one location in the first image, and wherein the proposed password includes at least three ordered gestures each of which is associated with a gesture type of the plurality of gesture types and at least one location in the first image.

12. The non-transitory computer-readable medium of claim 11, wherein the method further comprises:

generating a plurality of possible passwords that represent simulated proofs of knowledge for the first image based on the gesture selection functions in each of the plurality of gesture selection function sequences, wherein the possible password is generated as one of the plurality of possible passwords;

ranking the plurality of possible passwords based at least in part on a ranking of the gesture selection function sequence used to create each of the plurality of possible passwords; and wherein determining a relative strength of the proposed password, which represents a proof of knowledge of the first image, comprises determining whether the proposed password matches any one of the plurality of possible passwords by leveraging the simulated proofs of knowledge, and determining a rank of a matching password of the plurality possible passwords in response to determining that the proposed password matches one of the plurality of the plurality of passwords.

13. The non-transitory computer-readable medium of claim 11, wherein determining whether the proposed password matches the possible password comprises:

comparing the ordered gestures of the proposed password and the ordered gestures of the possible password;

determining whether the types of corresponding ordered gestures of the proposed password and possible password, respectively, are the same; and determining whether the location of the corresponding ordered gestures are within a threshold distance.

14. The non-transitory computer-readable medium of claim 11, wherein the at least one point of interest attributes are descriptive of at least one of the following: a semantic category of the point of interest; a shape of the point of interest; a color of the point of interest; and a size of the point of interest.

15. The non-transitory computer-readable medium of claim 11, wherein identifying a plurality of points of interest in the image data of the first image comprises using one or more object detection techniques to identify point of interest in the first image data.

* * * * *

UNITED STATES PATENT AND TRADEMARK OFFICE
CERTIFICATE OF CORRECTION

PATENT NO. : 9,069,948 B2  
APPLICATION NO. : 14/139459  
DATED : June 30, 2015  
INVENTOR(S) : Gail-Joon Ahn et al.

Page 1 of 1

It is certified that error appears in the above-identified patent and that said Letters Patent is hereby corrected as shown below:

In the claims

Column 21, Claim 1, line 2 "wherein the each of" should be --wherein each of--.
Column 23, Claim 6, line 24 "wherein the each of" should be --wherein each of--.
Column 24, Claim 11, line 50 "wherein the each of" should be --wherein each of--.

Signed and Sealed this
Tenth Day of November, 2015

Michelle K. Lee
*Director of the United States Patent and Trademark Office*